United States Patent
Carrer et al.

(10) Patent No.: US 7,809,733 B2
(45) Date of Patent: Oct. 5, 2010

(54) EFFORT BASED RELEVANCE

(75) Inventors: Marco Carrer, Reading, MA (US); Gopalan Arun, Nashua, NH (US); Xiaohua Lu, Nashua, NH (US); David Mor, Merrimack, NH (US)

(73) Assignee: Oracle International Corp., Redwood Shores, CA (US)

( * ) Notice: Subject to any disclaimer, the term of this patent is extended or adjusted under 35 U.S.C. 154(b) by 456 days.

(21) Appl. No.: 11/366,096

(22) Filed: Mar. 2, 2006

(65) Prior Publication Data

US 2007/0226205 A1    Sep. 27, 2007

(51) Int. Cl.
G06F 7/00 (2006.01)
G06F 17/30 (2006.01)
G06F 15/16 (2006.01)

(52) U.S. Cl. .................... 707/749; 707/767
(58) Field of Classification Search ............... 707/749, 707/767
See application file for complete search history.

(56) References Cited

U.S. PATENT DOCUMENTS

| | | | |
|---|---|---|---|
| 6,546,393 B1 * | 4/2003 | Khan | 707/10 |
| 7,185,065 B1 * | 2/2007 | Holtzman et al. | 709/217 |
| 2004/0030741 A1 * | 2/2004 | Wolton et al. | 709/202 |
| 2004/0093331 A1 * | 5/2004 | Garner et al. | 707/3 |
| 2006/0224608 A1 * | 10/2006 | Zamir et al. | 707/101 |
| 2006/0277465 A1 * | 12/2006 | Pandit et al. | 715/531 |
| 2007/0143101 A1 * | 6/2007 | Goutte | 704/9 |
| 2007/0271146 A1 * | 11/2007 | Nordmark et al. | 705/26 |

OTHER PUBLICATIONS

Wikipedia, the free encyclopedia. FAQ. http://en.wikipedia.org/w/index.php?title=FAQ&oldid=10833266, Feb. 26, 2005, 4 pages. Accessed: Jul. 7, 2008.*

* cited by examiner

Primary Examiner—Tony Mahmoudi
Assistant Examiner—Brian E Weinrich
(74) Attorney, Agent, or Firm—Kraguljac & Kalnay, LLC

(57) ABSTRACT

Systems, methods, media, and other embodiments associated with effort based relevance in discussion forums are described. One example method includes receiving activity data concerning messages associated with electronic discussion forum topics. The activity data may include a view count (Vw), a book mark count (Bf), a reference count (Rf), and a reply count (Rp). The effort based relevance may be computed from Vw and one or more of, Bf, Rf, and Rp. Topics may be logically ordered using the effort based relevance.

19 Claims, 9 Drawing Sheets

EFFORT BASED RELEVANCE

BACKGROUND

Discussion forums provide an increasingly popular medium through which people may participate in an information sharing community. In a discussion forum people may ask questions, share opinions, provide answers to questions, and so on. Discussion forums typically employ an electronic bulletin board to provide access to various "conversations" or "threads". As the number of conversations increases and as the number of messages added to the increasing number of conversations expands it can be difficult for users to locate and/or isolate content in which they are interested. Thus, users may be overwhelmed by the volume of information they may need to navigate to locate specific information. Additionally, not all the information may be relevant to the user and not all the information may have equal value. Thus, a user may become distracted by irrelevant and/or useless threads, lose focus, and become lost.

Relevancy in the context of a discussion forum may be regarded from different points of view. A first aspect of relevancy may be traditional keyword based relevancy. A user may be looking for information in threads (e.g., conversations) that discuss a certain subject. A conversation may include an original message and replies to that message. Conventionally, these threads and/or messages within the threads may be found using a keyword search. However, this type of search may provide a large number of threads and/or messages that are potentially irrelevant. Some discussion forums therefore provide additional information about a thread and/or a message. For example, a discussion forum may consider information about how many times a certain thread has been accessed and/or how many times a particular message in a thread has been accessed. This information may be used to further rank items retrieved in response to a keyword based search. Additionally and/or alternatively, this information may be provided to users so that they can decide which threads and/or messages to review. Some discussion forums may also provide other statistics (e.g., reply count, user rating) that may be presented to a user and/or used to further rank items previously ranked by keyword relevancy.

BRIEF DESCRIPTION OF THE DRAWINGS

The accompanying drawings, which are incorporated in and constitute a part of the specification, illustrate various example systems, methods, and other examples of various aspects of the invention. It will be appreciated that the illustrated element boundaries (e.g., boxes, groups of boxes, or other shapes) in the figures represent one example of the boundaries. One of ordinary skill in the art will appreciate that in some cases one element may be designed as multiple elements, multiple elements may be designed as one element, an element shown as an internal component of another element may be implemented as an external component and vice versa, and so on. Furthermore, some elements may not be drawn to scale.

DETAILED DESCRIPTION

Example systems and methods concern effort based relevance in a discussion forum environment. Effort based relevance facilitates quantifying how relevant a message may be to other users in various contexts (e.g., browsing, searching, administering) based on how much effort a user(s) puts into a message. In one example, message relevancies may be aggregated into topic relevancies. Effort may be gauged by tracking and analyzing various activities performed with respect to a thread and/or message. These activities may include, for example, viewing an item, book marking an item, referencing an item, replying to an item, rating an item, requesting that an item be censored, and so on.

View count is a basic statistic associated with discussion forums. When a message in a thread is accessed a view count statistic for that message and/or thread may be updated. Tracking the number of times an item (e.g., thread, message) is accessed (e.g., viewed) provides baseline information concerning that item. Items having higher view counts (e.g., that are viewed more frequently) are likely more interesting and/or contain more valuable information than those with lower view counts. Tracking and quantifying additional actions taken for an item facilitates producing additional information upon which further processing may be based. This further processing may include, for example, making recommendations concerning additional items to access.

One additional action that may be tracked is the number of replies to an item. Items for which there is a high ratio of replies to views may indicate that the item is provocative, timely, interesting, unresolved, and so on. A reply may be, for example, a response to a question, an additional question, an observation on a question/answer pair, and so on. Topics with long reply trails (e.g., a large number of replies) have content that is relatively popular compared to other topics.

Another additional action that may be tracked is the number of times an item is book marked. A book mark may be used to facilitate easily returning to an item. While the term "book mark" is employed, the concept associated with a "book mark" is to facilitate recalling that an item has been accessed and to facilitate returning to that item. Items for which there is a high ratio of book marks to views may indicate that the items contain resolved information that may be useful on an on-going basis. The high ratio of book marks to views may indicate that there is long term interest in an item.

Another additional action that may be tracked is the number of times an item is referenced. Items for which there is a high ratio of references to views may indicate that the items contain resolved information (e.g., an answer to a question). When an item is referenced by other items, its lifetime is prolonged. This type of item may be a candidate subject for an automatically generated frequently asked question.

Figure 3:
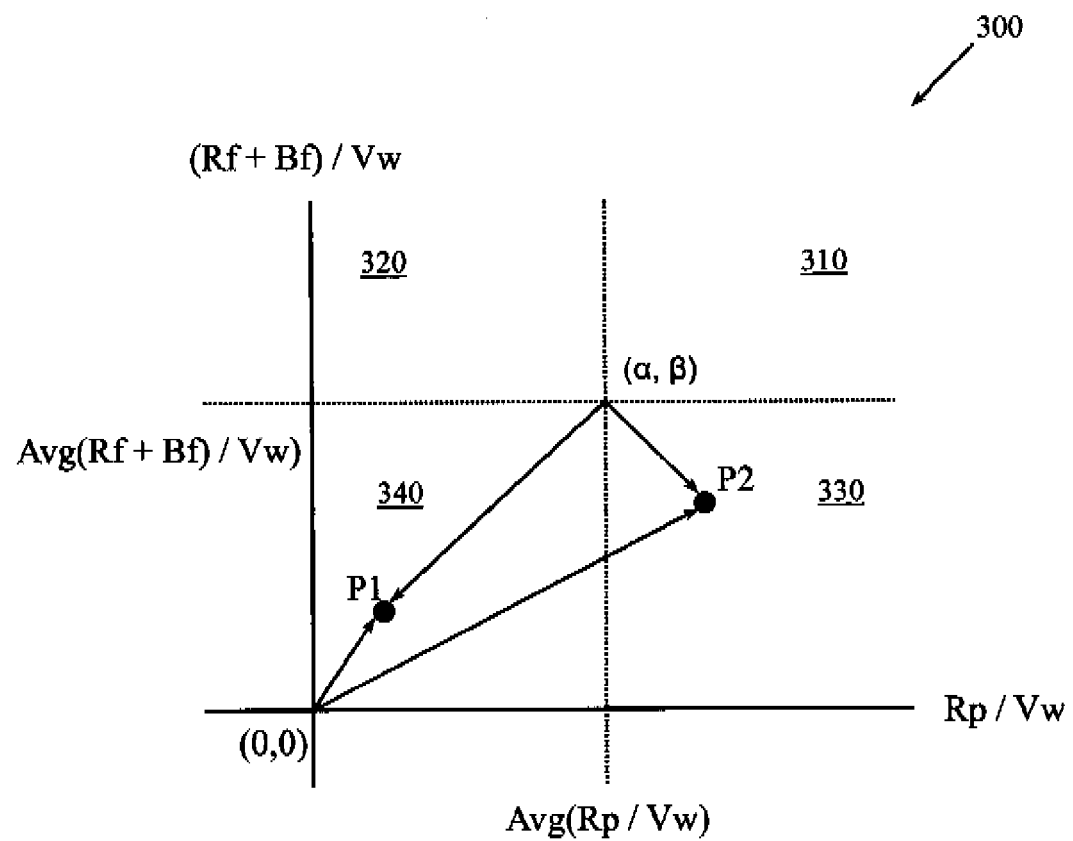
FIG. 3 illustrates an example graph that illustrates partitions associated with effort based relevance.

While each of these additional actions is interesting in isolation, combining information concerning the additional actions may provide even further insights and allow even more interesting additional processing. Some mathematics illustrates one possibility. FIG. 3 facilitates visualizing the results of this math.

Let $V_W$=number of views for an item
Let $R_P$=number of replies for an item
Let $R_F$=number of references to an item
Let $B_F$=number of users who bookmarked an item Now, consider a graph 300 having an X axis associated with $R_P/V_W$ and a Y axis associated with $(R_F+B_F)/V_W$.

Consider computing two additional values that will facilitate dividing the graph into quadrants. The two additional values are:

$$\alpha = \text{Average}(R_P/V_W)$$

$$\beta = \text{Average}((R_F+B_F)/V_W).$$

Information gathered about an item can now be used to position the item on the X-Y graph and with respect to the $\alpha$ and $\beta$ quadrant forming reference points. Items in the graph may have a score that varies directly with the distance from the X,Y graph origin. Items in a quadrant may have a score that varies directly with the distance from the $(\alpha, \beta)$ intersection. These scores indicate an overall effort based relevance for an item and a relevance of an item with respect to the quadrant in which it is located. The different quadrants highlight different characteristics associated with an item. When a user navigates in a particular quadrant, the scores may be used to recommend other topics that a user may wish to access.

In the example, the upper right quadrant 310 may be considered to contain the "most popular" items. These items have received both a high number of references (and/or book marks) and a high number of replies. These topics may be good starting points for navigating a discussion forum and thus may be suggested as useful entry points for a user visiting a discussion forum.

The upper left quadrant 320 may be considered to contain "highly referenced" items and "highly book marked" items that have not received many replies. Thus, these may appear to be "terminal" items (e.g., items that provide answers). These items may be good candidates for users who came to a discussion forum looking for answers to questions. In one example, these types of items may be provided by a software vendor as a sort of self-help support center.

The lower right quadrant 330 may be considered to contain stimulating items that receive a lot of replies but which are neither referenced nor book marked. Thus, these may be "interesting" items that stimulate replies but that require no long-term commitment (e.g., reference, book mark). These items may be useful for a user who wants to find out what is going on in a discussion forum and who wants to participate in an ongoing active thread. This quadrant may satisfy queries like "what's today's hot topic?"

The lower left quadrant 340 may be considered to contain items that are popular to read but which receive little additional user effort (e.g., replies, references, book marks). Items in this quadrant may be recommended as entry points for users.

In one example, systems and methods may be configurable with respect to combining traditional keyword based relevancy ranking and effort based relevancy ranking. Additionally, systems and methods may be configurable with respect to context-sensitive (e.g., quadrant based) ranking. In one example, traditional keyword based searching may produce a ranked list of items. These items may be ranked on traditional keyword matching attributes (e.g., term frequency, term location). In the example, a determination may then be made concerning in which quadrant a user is operating. For example, is a user looking for questions or is the user looking for answers. Based on the quadrant determination, scores associated with effort based relevance ranking may then be combined with scores associated with keyword based relevancy to produce a blended relevancy. Decisions concerning which items to display to a user, which items to recommend to a user, and so on, may then be based on the blended relevancy.

In one example, systems and methods may be configurable with respect to time periods for which effort based relevance is computed. For example, a first user may be interested in viewing items whose effort based relevance has been computed over the lifetime of a discussion forum. A second user may be interested in viewing items whose effort based relevance has been computed over the last month. A third user may be interested in viewing items whose effort based relevance was computed in relation to a certain date (e.g., new product release data, third quarter in a certain year, the weeks before and after an election). This type of time configurability facilitates responding to questions concerning what users were reading, asking, replying to, and book marking at various points in time and or for various spans of time. This information may be useful, for example, to a systems administrator looking for items to archive, to purge, to highlight, to censor, and so on.

Some items may receive ratings from users. For example, a user may give an item a score of three out of five stars on various attributes like usefulness, timeliness, and so on. In one example, these ratings may be used to weight an effort based relevance score. Once again this information may be useful to a systems administrator looking for items to purge or looking to re-compute an index to facilitate faster retrieval of certain (e.g., most popular, most relevant) items.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, software in execution, combinations thereof). Computer components may include, for example, a process running on a processor, a processor, an object, an executable, a thread of execution, a program, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data that can be read by a computer. A computer-readable medium may take forms, including, but not limited to, non-volatile media (e.g., optical disk, magnetic disk) and volatile media (e.g., semiconductor memory, dynamic memory). Common forms of computer-readable mediums include floppy disks, hard disks, magnetic tapes, CD-ROMs, RAMs, ROMs, and so on.

"Logic", as used herein, includes but is not limited to hardware, firmware, software embodied on a computer-readable medium, and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combination of gates, other circuit components, and so on. Where multiple logical units are described, it may be possible in some examples to incorporate the multiple logical units into one physical logic. Similarly, where a single logical logic is described, it may be possible in some examples to distribute that single logical logic between multiple physical units.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions stored on a computer-readable medium that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logical units and thus may be loaded and/or executed in serial, parallel, massively parallel and other manners.

Suitable software for implementing various components of example systems and methods described herein may be developed using programming languages and tools (e.g., Java, C, C#, C++, SQL, APIs, SDKs, assembler). Software, whether an entire system or a component of a system, may be embodied as an article of manufacture and maintained or provided as part of a computer-readable medium. Software may include signals that transmit program code to a recipient over a network or other communication medium.

"User", as used herein, includes but is not limited to, one or more persons, software, computers or other devices, or combinations of these.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

It will be appreciated that electronic and software applications may involve dynamic and flexible processes and thus that illustrated blocks can be performed in other sequences different than the one shown and/or blocks may be combined or separated into multiple components. In some examples, blocks may be performed concurrently, substantially in parallel, and/or at substantially different points in time.

Figure 1A:
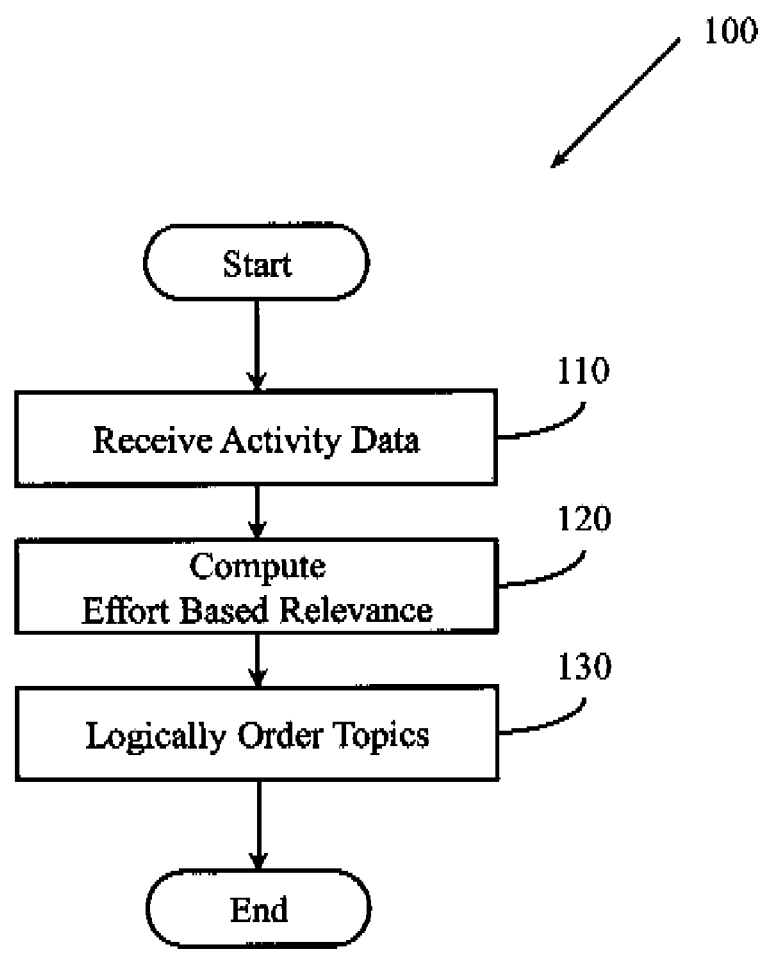
FIGS. 1A, 1B and 1C illustrate example methods associated with effort based relevance.

FIG. 1A illustrates a computer-implemented method 100. Method 100 may include, at 110, receiving an activity data. The activity data may concern messages associated with a set of topics associated with an electronic discussion forum. The electronic discussion forum may be implemented, for example, using an electronic bulletin board. The activity data may include, for example, a view count (Vw), a book mark count (Bf), a reference count (Rf), and a reply count (Rp). Vw may concern, for example, the number of times a user viewed a message and/or a topic, the number of times a set of users viewed a message and/or a topic, the total number of times a message was viewed, and so on. Vw may be provided for different time periods including, for example, views over the lifetime of a discussion forum, views within a restricted time range, views since a certain point in time, views before a certain point in time, and so on.

Bf may concern, for example, the number of times a user manipulated a data structure to facilitate returning to a message and/or topic. For example, a user may have added an entry to a "favorites" list, may have established a desktop icon link to the entry, and so on. Like Vw, in different examples Bf may be related to an individual user, sets of users, and/or all users for various periods of time. Rf may concern, for example, the number of times a user manipulated a data structure to facilitate having another message and/or topic locate a message. For example, a user may have added a link to the referenced message to a reply or to a message in another thread. Rp may concern, for example, the number of replies to a message. In different examples Rp may be computed for an individual, for a set of users, for all users, and may be computed for different periods of time.

Method 100 may also include, at 120, computing an effort based relevance for a member of the set of topics based on Vw and one or more of Bf, Rf, and Rp for the member. In one example, the effort based relevance will be computed as the Euclidean distance from an origin (e.g., 0,0) to a point in an X,Y graph. The x co-ordinate in the graph for a topic may be determined, for example, by Vw and Rp (e.g., Rp/Vw). The y co-ordinate in the graph for a topic may be determined, for example, by Vw, Bf and Rf (e.g., (Bf+Rf/Vw). In one example, effort based relevance may be computed for different periods of time (see FIG. 1B, step 120'). For example, effort based relevance may be computed for the lifetime of a discussion forum, for a period of time having a defined start and end (e.g., second quarter of 2005), for a period of time before and/or after a certain date (e.g., week before and after an election), and so on.

In one example, computing effort based relevance may also include computing a second measurement. The second measurement may be the distance between a point in an X,Y graph associated with a topic and the intersection of two axis partitioning measures. For example, an X axis partitioning measure ($\alpha$) may be based on the average of (Rp/Vw) for a set of topics and a Y axis partitioning measure ($\beta$) may be based on the average of ((Rf+Bf)/Vw) for the set of topics. Thus, the second measurement may be the distance between a point in an X,Y graph associated with a topic and the intersection of $\alpha$ and $\beta$. In one example, effort based relevance may be based on both the Euclidean distance from a first point described by the intersection of the X axis and the Y axis (e.g., 0,0) and the Euclidean distance from a second point described by the intersection of $\alpha$ and $\beta$. This may facilitate providing information concerning overall relevance for a topic and also context-sensitive relevance for a topic.

Method 100 may also include, at 130, logically ordering the set of topics with respect to effort based relevance. For example, topics may be ordered based on their Euclidean distance from the origin, based on their X co-ordinate, based on their Y co-ordinate, and so on. In one example, individual messages may be used to order a set of topics while in another example aggregations of messages may be used to order a set of topics. Since effort based relevance may include two components (e.g., distance from origin, distance from ($\alpha$, $\beta$)), topics may be logically ordered overall and/or within a certain context. The context may be associated with, for example, a task the user is performing like following a topic, participating in a topic, referencing an element in a topic, and performing a combination of tasks. The context may also be associated with a quadrant in the X,Y graph in which a topic is located.

In one example, effort based relevance may be combined with keyword based relevance. Thus, a user may be presented with information (e.g., choices, recommendations) that can guide them to additional topics and/or messages with similar keyword relevancies (e.g., similar subject matter) and similar effort based relevancy. In this way a user may find a topic that has had similar actions (e.g., numerous resolved questions) on similar subject matter.

In one example, the activity data may also include a rating data (Rd). Rd may be, for example, a score attached to a message and/or topic by a user(s). This score may be, for example, a number of stars given to a message and/or topic, a numeric score, and so on. This rating data may be used to manipulate (e.g., recalculate) the effort based relevance. For example, if a high percentage of users who read a message with a high Vw give the message a low Rd, then it may be desirable to reduce the effort based relevancy that would otherwise attach to the message. For example, a certain message may have a very provocative title or subject that prompts many users visiting the discussion forum to read the message. However, the body of the message may not live up to the subject and the message therefore consistently receives a low user rating. Conversely, a message with a low Vw may consistently receive a high user rating. In this case, it may be desirable to increase the effort based relevancy that would otherwise attach to the message. For example, a certain message may have a very non-descript or even inaccurate title or subject that leads discussion forum users to ignore the message. However, those brave few who read the message may rate it very highly since it may provide some critical nugget of information. Thus, method 100 may also include weighting effort based relevance using Rd.

Figure 1B:
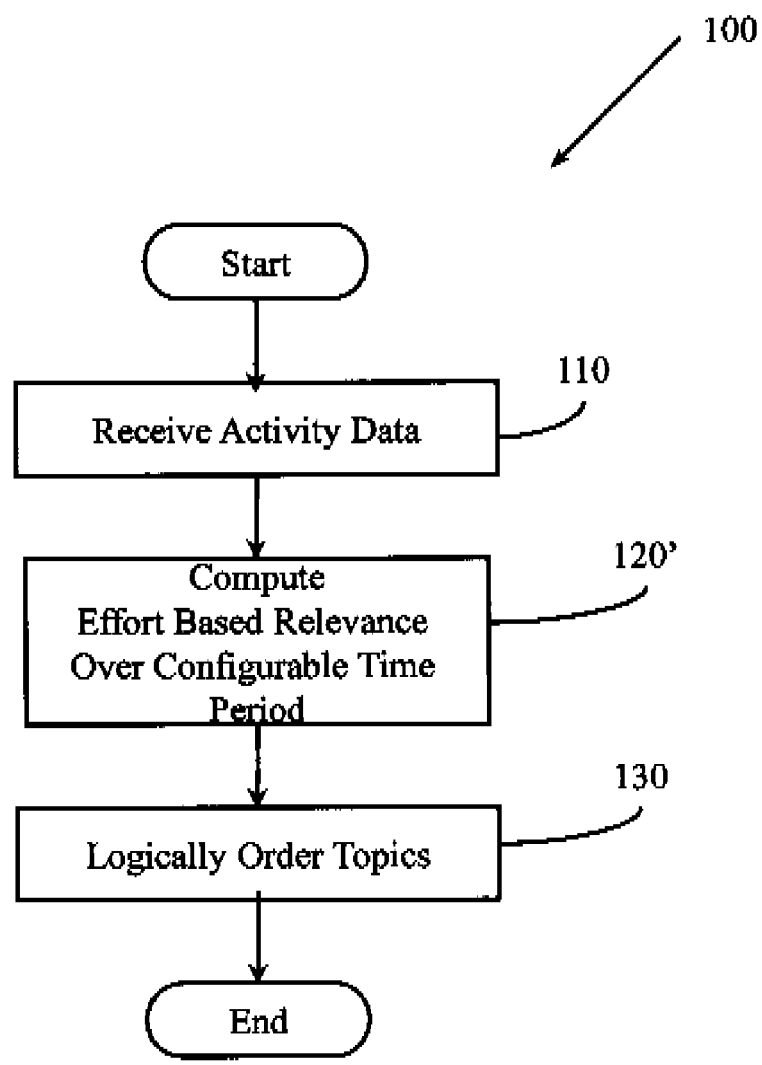
Figure 1C:
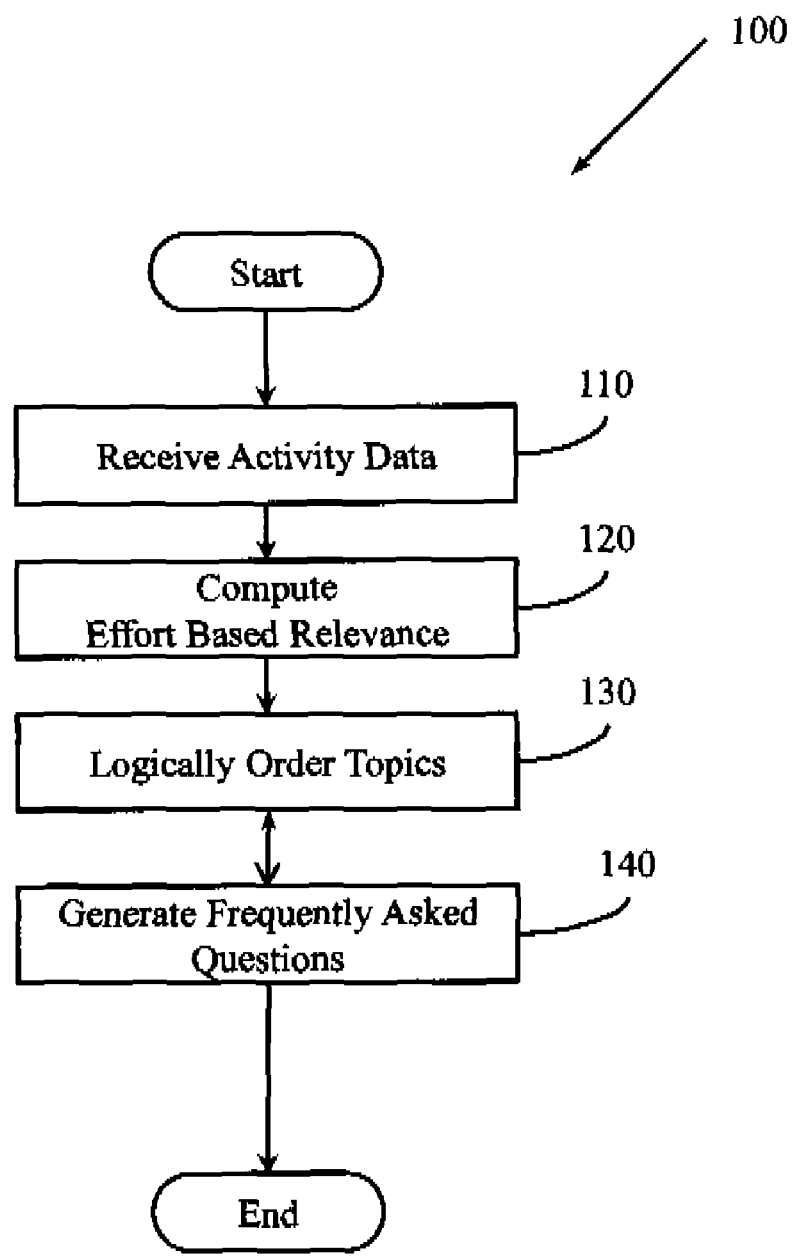

Method 100 may also include automatically generating a set of frequently asked questions (see FIG. 1C, step 140). Certain ratios of Vw, Rf, Rd, and Bf may indicate that a certain topic includes questions and answers that users are consistently reading. Thus, method 100 may be configured to provide discussion forum with an entry point for these messages and/or topics based, at least in part, on the effort based relevance for these messages and/or topics. While "frequently asked questions" is used to describe this entry point, the concept concerns making a separate and/or additional entry point for users visiting a discussion forum where the entry point makes it easier for a user to find these messages.

In one example, method 100 may include providing a two-dimensional plot of the relative position of members of the set of topics. FIG. 3 illustrates one example of a co-ordinate system on which the plot may be placed. This plot may be provided, for example, as a set of data that may be rendered, as a set of data that has been rendered, as a spread sheet, as a database table, and so on. The position of a topic may be determined by effort based relevance. In one example, the X component of a topic position will be (Rp/Vw) and the Y component of a topic position will be ((Bf+Rf)/Vw).

While FIGS. 1A, 1B, and 1C illustrate various actions occurring in serial, it is to be appreciated that various actions illustrated in FIGS. 1A, 1B, and 1C could occur substantially in parallel. By way of illustration, a first process could receive activity data, a second process could compute effort based relevancy, and a third process could logically order topics. While three processes are described, it is to be appreciated that a greater and/or lesser number of processes could be employed and that lightweight processes, regular processes, threads, and other approaches could be employed. Furthermore, since activity data may be received in a substantially continuous manner, these processes may be configured to operate in parallel to facilitate substantially continuously updating the order of topics based on updated effort based relevancy.

In one example, a method is implemented as processor executable instructions and/or operations stored on a computer-readable medium. Thus, in one example, a computer-readable medium may store processor executable instructions operable to perform a method that includes receiving an activity data concerning messages associated with members of a set of topics associated with an electronic discussion forum. The method may also include computing an effort based relevance for members of the set of topics based on the activity data. The method may also include logically ordering the set of topics based on the computed effort based relevance. While the above method is described being stored on a computer-readable medium, it is to be appreciated that other example methods described herein may also be stored on a computer-readable medium.

Figure 2:
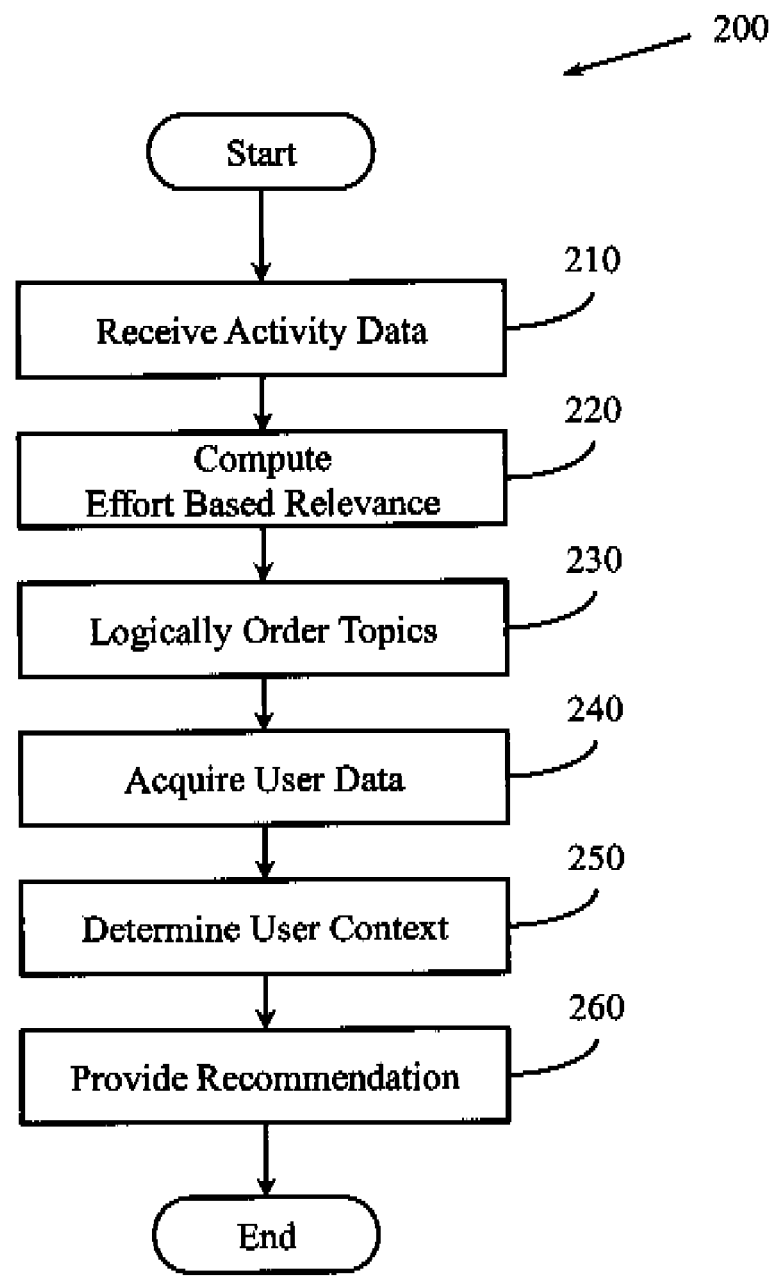
FIG. 2 illustrates an example method associated with effort based relevance.

FIG. 2 illustrates a computer-implemented method 200. Method 200 includes some elements similar to those described in connection with method 100 (FIG. 1). For example, method 200 includes receiving activity data at 210, computing effort based relevance at 220, and logically ordering topics at 230. However, method 200 includes additional actions.

For example, method 200 may include, at 240, acquiring a user data concerning a user visiting the discussion forum. The user data may include, for example, a set of viewed topics, a set of viewed messages, a set of queries provided by the user, and so on. This user data is related to what a user is doing when they visit a discussion forum. Are they just reading messages? Are they replying to messages? Are they looking for answers to questions? The type of activity in which a user is engaged may effect how effort based relevance is used to guide the user to various additional topics and/or messages. For example, a user who is book marking messages or topics dealing with installing an operating system upgrade may be guided to similar installation topics.

Method 200 may include, at 250, determining a context in which the user is operating. The context may be, for example, that a user is following a topic, participating in a topic, referencing an element in a topic, and performing a combination of these actions. These contexts may be determined, for example, by evaluating ratios between messages viewed, referenced messages viewed, book marked messages viewed, replies viewed, replies posted, and so on. The types of information in which a user may be interested may depend on their context. For example, a user who is reading messages with long reply trails may be interested in reading "what's hot".

Method 200 may also include, at 260, providing recommendation data to the user. Recommendation data may include topics that method 200 determines are relevant to a user. The determination may be based on the context in which the user is operating and the effort based relevance for topics. For example, if a user is simply reading messages, then interesting topics that are mostly read and rarely replied to or referenced may be provided as additional reading recommendations to a user. However, if a user is reading messages and following reply and/or reference trails that indicate that a user is looking for an answer to a question, then a different set of messages and/or topics that may relate to answering questions in the subject area may be provided to the user as additional viewing recommendations.

FIG. 3 illustrates a graph 300 that facilitates visualizing how a set of topics may be logically partitioned into different categories. For example, topics appearing farther out the X axis may have longer reply trails while topics appearing farther out the Y axis may be more frequently referenced and/or book marked.

A first point P1 is illustrated in quadrant 340. A second point P2 is illustrated in quadrant 330. Point P1 is closer to origin (0,0) than P2. Point P1 is farther from point (α, β) than point P2. While point P2 may have a greater effort based relevance than P1 overall, within their respective quadrants point P1 may be more relevant. A user who is reading without taking other actions may be directed to a topic with an effort based relevance near P1 while a user who is reading and responding may be directed to a topic with an effort based relevance near P2.

Figure 4:
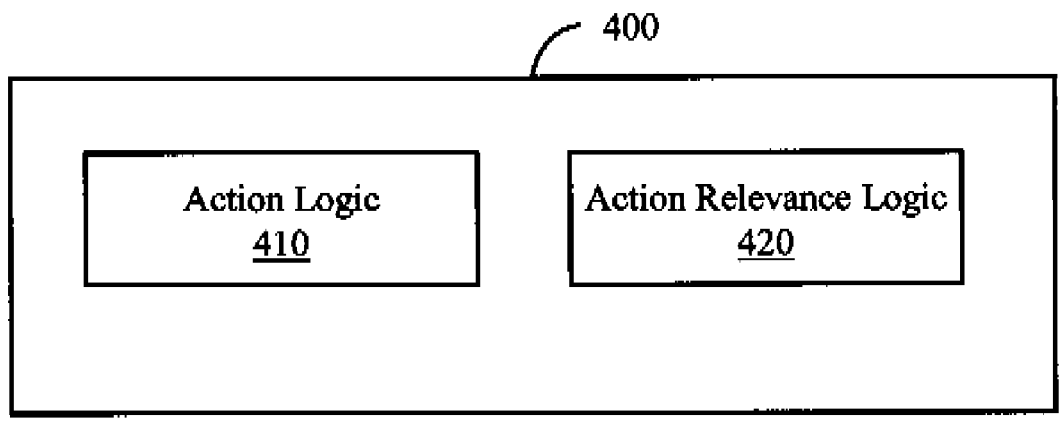
FIG. 4 illustrates an example system associated with action based relevance.

FIG. 4 illustrates a system 400 that includes an action logic 410 that is configured to track actions taken by users on messages associated with topics in an electronic discussion forum. Tracking these actions facilitates determining how much time and/or energy a user or set of users is putting into interacting with a given topic or message in the discussion forum. The action logic 410 may be configured to compute a value $count_{view}$ that stores the number of times a message was viewed. $Count_{view}$ may include the number of times the message was viewed by a particular user, by a set of users, by all users, and so on. $Count_{view}$ may be configured to include the number of times the message was viewed during various time periods including, for example, the lifetime of the discussion forum, a particular day, a particular month, and so on. Determining how often a message and/or topic was viewed provides a value against which other actions, or lack thereof, can be compared to determine the action based relevance for an item.

The action logic 410 may also be configured to compute a value $count_{respond}$ that stores the number of responses to a message. Reponses to a message may indicate that it is provocative, that it is asking a question for which people are providing answers, and so on. Like $count_{view}$, $count_{respond}$ may include the number of responses to a message from a particular user, from a set of users, by all users, and so on for different periods of time. Items with a long response trail may indicate items having outstanding issues like open questions.

The action logic 410 may also be configured to compute a value $count_{internal}$ that stores the number of times an internal link was created to a message and a value $count_{external}$ that stores the number of times an external link was created to a message. An internal link is a link that makes it easier for the user who created the link to return to the linked item. An external link is a link that makes it easier for a user other than the user who created the link to locate the linked item. Like $count_{view}$ and $count_{respond}$, $count_{internal}$ and $count_{external}$ may include the number of links created by a particular user, by a set of users, by all users, and so on for different periods of time. Items having a high ratio of links to viewings may be items that contain useful information that users want to have at their fingertips or that users want to bring to the attention of other users.

System 400 may also include an action relevance logic 420 that is configured to determine an action based relevance for a topic. The action based relevance may be based, at least in part, on the actions taken by users. In one example, the action based relevance may take the form of a numeric value. The numeric value may be based on a vector connecting an origin to a point (recall the plot in FIG. 3). The vector may have an X component and a Y component. In one example, the X component may be based on a ratio of $count_{view}$ to $count_{respond}$ and the Y component may be based on a ratio of $count_{view}$ to $count_{internal}$ and $count_{external}$.

Figure 5:
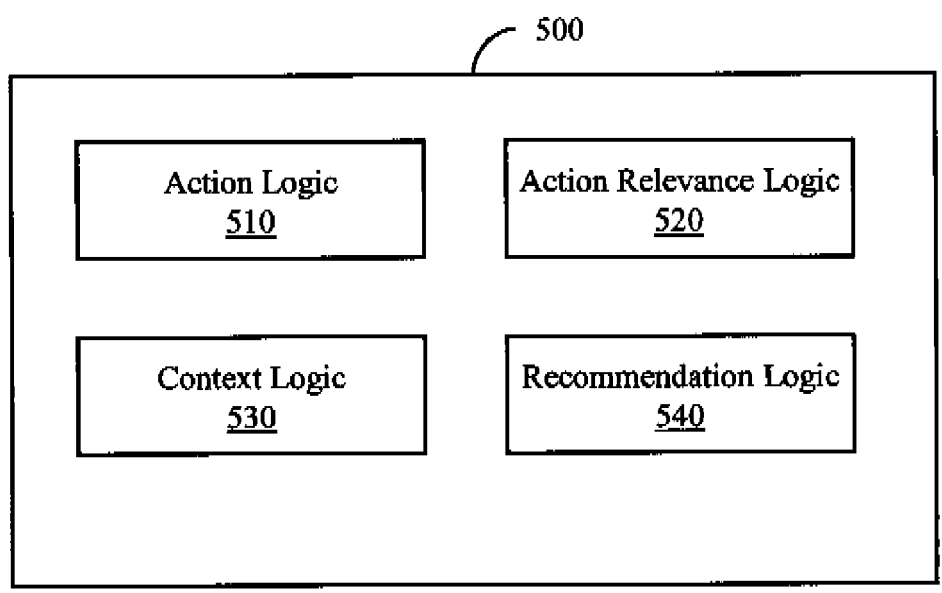
FIG. 5 illustrates an example system associated with action based relevance.

FIG. 5 illustrates a system 500. System 500 has some elements similar to elements in system 400 (FIG. 4). For example, system 500 includes an action logic 510 and an action relevance logic 520. However, system 500 may include additional elements not found in system 400.

System 500 may include a context logic 530 that is configured to acquire user data concerning a user visiting the discussion forum. This user data may include information about a set of topics that were viewed by a user(s), a set of messages that were viewed by a user(s), a set of queries provided by a user(s), and so on. The context logic 530 may also be configured to determine a context in which the user is operating.

System 500 may also include a recommendation logic 540 that is configured to provide a recommendation data to the user. This recommendation data may include a set of topics in which system 500 considers a user may be interested. Which topics are recommended may depend, at least in part, on the context in which the user is operating and the action based relevance. For example, a user who is looking for topics and/or messages that are highly read, highly linked, and highly responded to may be steered towards a first set of topics while a user who is looking for "hot" topics that are unresolved may be steered towards a different set of topics.

System 500 may also include a timeframe logic that is configured to control the action relevance logic 520 to determine action based relevance for different configurable periods of time. For example, a first user may be interested in action based relevance that spans the lifetime of a discussion forum while a second user may only be interested in action based relevance for the past month. Consider a discussion forum administrator who is trying to reclaim some memory. The discussion forum administrator may compute action based relevancies using several time frames. This may facilitate identifying recently active threads, previously active threads, consistently active threads, dead threads, irrelevant threads, and so on.

System 500 may also include a presentation logic that is configured to display a two dimensional graphical representation of relationships between topics. The relationships may be based on action based relevance. Various points may be presented on the two dimensional graphical representation and these points may be used as entry points to discussion topics. For example, an interactive graphical representation may be presented to a user. The user may click on a point in the graphical representation to be taken to topics having similar action based relevancies. When coupled with keyword based relevancy, the action based relevancy may facilitate locating topics that are related not only by subject matter but also by activity types and levels.

Figure 6:
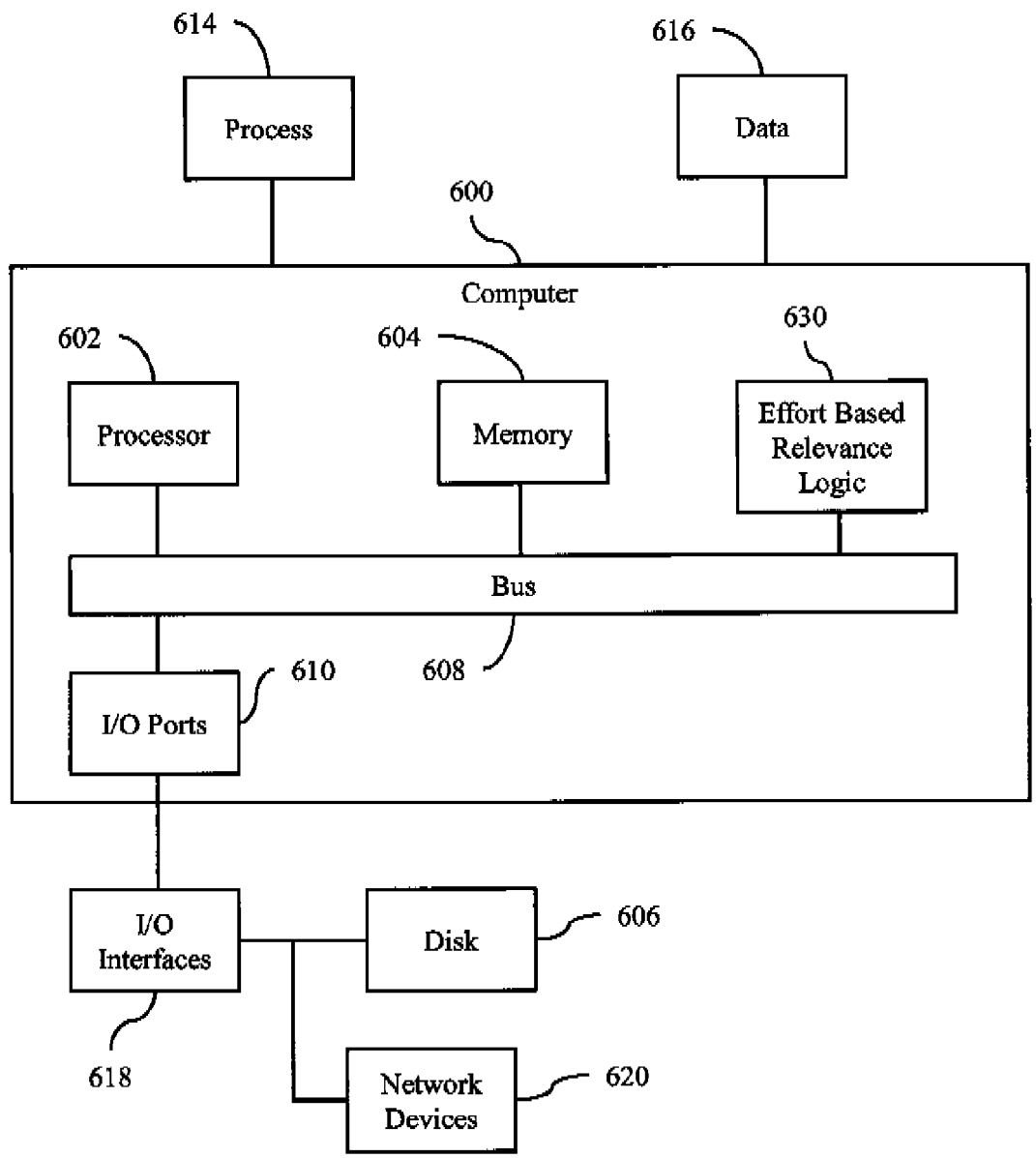
FIG. 6 illustrates an example computing environment in which example systems and methods illustrated herein may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, computer 600 may include an effort based relevance logic 630 configured to facilitate determining and/or using effort based relevance. In different examples, logic 630 may be implemented in hardware, software, firmware, and/or combinations thereof. Thus, logic 630 may provide means (e.g., hardware, software embodied as computer-executable instructions on a computer-readable medium or in execution on a computer, firmware) for tracking user actions taken on topics in a discussion forum, means (e.g., hardware, software, firmware) for determining effort based relevance for the topics based on the user actions, and means (e.g., hardware, software embodied as computer-executable instructions on a computer-readable medium or in execution on a computer, firmware) for recommending topics to a user based on effort based relevance. While logic 630 is illustrated as a hardware component attached to bus 608, it is to be appreciated that in one example, logic 630 could be implemented in processor 602.

Generally describing an example configuration of computer 600, processor 602 may be a variety of various processors including dual microprocessor and other multi-processor architectures. Memory 604 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

Disk 606 may be operably connected to the computer 600 via, for example, an input/output interface (e.g., card, device) 618 and an input/output port 610. Disk 606 may be, for example, a magnetic disk drive, a solid state disk drive, a floppy disk drive, a tape drive, a Zip drive, a flash memory card, and/or a memory stick. Furthermore, disk 606 may be a CD-ROM, a CD recordable drive (CD-R drive), a CD rewriteable drive (CD-RW drive), and/or a digital video ROM drive (DVD ROM). Memory 604 can store processes 614 and/or data 616, for example. Disk 606 and/or memory 604 can store an operating system that controls and allocates resources of computer 600.

Bus 608 may be a single internal bus interconnect architecture and/or other bus or mesh architectures. While a single bus is illustrated, it is to be appreciated that computer 600 may communicate with various devices, logics, and peripherals using other busses (e.g., PCIE, SATA, Infiniband, 1394, USB, Ethernet). Bus 608 can be types including, for example, a memory bus, a memory controller, a peripheral bus, an external bus, a crossbar switch, and/or a local bus. The local bus may be, for example, an industrial standard architecture (ISA) bus, a micro-channel architecture (MSA) bus, an extended ISA (EISA) bus, a peripheral component interconnect (PCI) bus, a universal serial (USB) bus, and a small computer systems interface (SCSI) bus.

Computer 600 may interact with input/output devices via i/o interfaces 618 and input/output ports 610. Input/output devices may be, for example, a keyboard, a microphone, a pointing and selection device, cameras, video cards, displays, disk 606, network devices 620, and so on. Input/output ports 610 may include, for example, serial ports, parallel ports, and USB ports.

Computer 600 can operate in a network environment and thus may be connected to network devices 620 via i/o interfaces 618, and/or i/o ports 610. Through the network devices 620, computer 600 may interact with a network. Through the network, computer 600 may be logically connected to remote computers. Networks with which computer 600 may interact include, but are not limited to, a local area network (LAN), a wide area network (WAN), and other networks. In different examples, network devices 620 may connect to LAN technologies including, for example, fiber distributed data interface (FDDI), copper distributed data interface (CDDI), Ethernet (IEEE 802.3), token ring (IEEE 802.5), wireless computer communication (IEEE 802.11), and Bluetooth (IEEE 802.15.1). Similarly, network devices 620 may connect to WAN technologies including, for example, point to point links, circuit switching networks (e.g., integrated services digital networks (ISDN)), packet switching networks, and digital subscriber lines (DSL).

Figure 7:
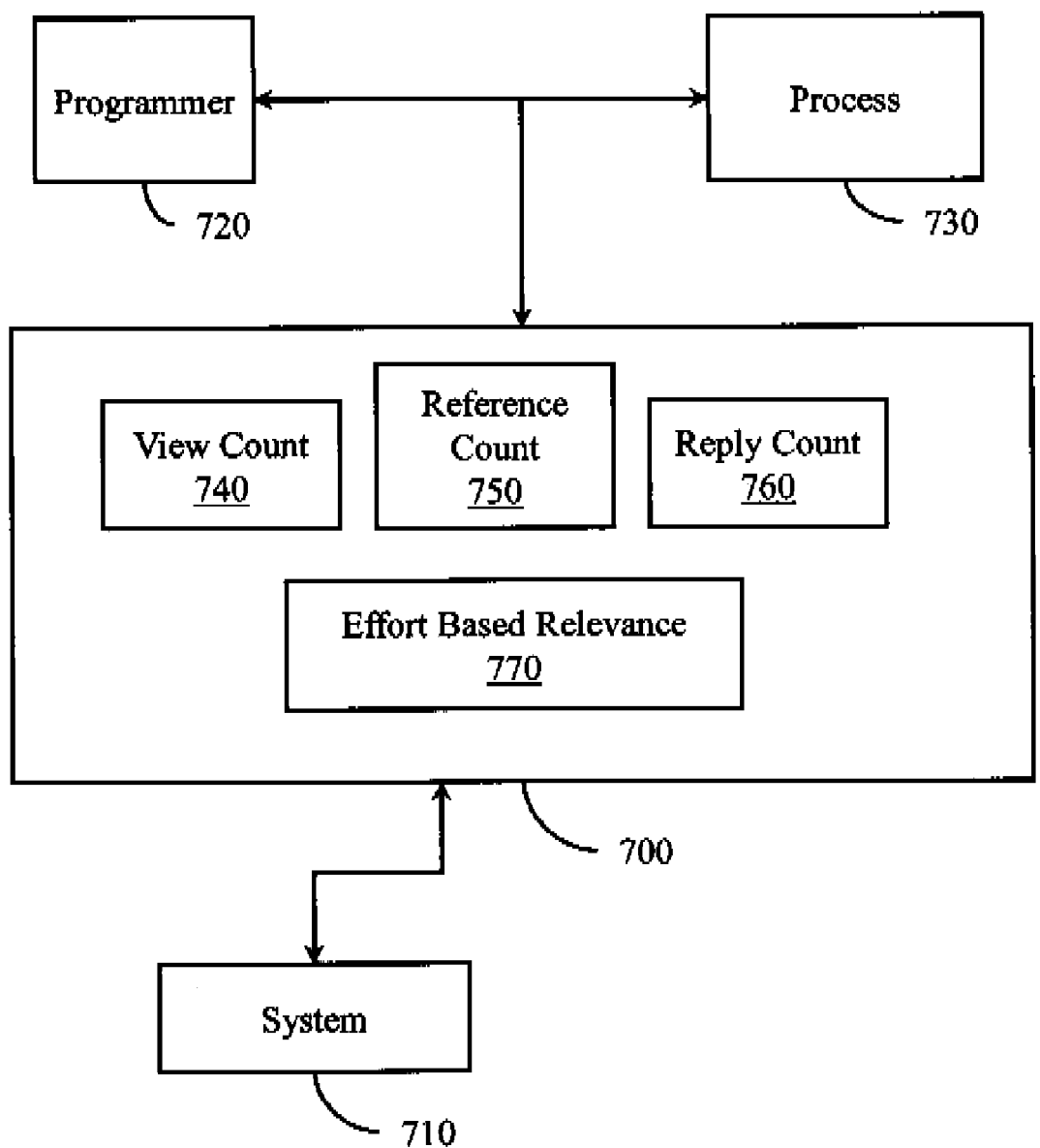
FIG. 7 illustrates an example application programming interface (API).

FIG. 7 illustrates an application programming interface (API) 700 that provides access to an effort based relevance system 710. API 700 can be employed, for example, by a programmer 720 and/or a process 730 to gain access to processing performed by system 710 and/or a functionally equivalent method. For example, programmer 720 can write a program to access system 710 (e.g., invoke its operation, monitor its operation, control its operation) where writing the program is facilitated by the presence of API 700. Rather than programmer 720 having to understand the internals of system 710, programmer 720 merely has to learn the interface to system 710. This facilitates encapsulating the functionality of system 710 while exposing that functionality.

API 700 may facilitate providing data values to system 710 and/or may facilitate retrieving data values from system 710. For example, a process 730 that tracks view counts can provide view count data to system 710 via API 700 by using a call provided in API 700. In one example, an API 700 can be stored on a computer-readable medium.

Interfaces in API 700 can include, but are not limited to, a first interface 740 that communicates a view count data, a second interface 750 that communicates a reference count data, a third interface 760 that communicates a reply count data, and a fourth interface 770 that communicates an effort based relevance data derived from the view count data, the reference count data, and the reply count data. In different examples the view count data may describe, for example, how many times a particular user viewed a message or messages in a topic, how many times a set of users viewed a message or messages in a topic, how many total times a message was viewed, and so on. In different examples the reference count data may describe how many times a message or topic was referenced by a user, a set of users, and/or all users for different periods of time. Similarly, the reply count data may describe how many replies exist for a message or topic. The replies may be related to a user, a set of users, and/or all users for different periods of time. The effort based relevance data may describe the effort based relevance computed for a message and/or topic.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:

receiving activity data concerning messages associated with members of a set of topics associated with an electronic discussion forum, the activity data including a view count (Vw), a book mark count (Bf), a reference count (Rf), a reply count (Rp), and rating data (Rd);

computing effort based relevance for a configurable period of time for members of the set of topics based on Vw, Bf, Rf, and Rp;

weighting effort based relevance based on Rd;

logically ordering the set of topics with respect to effort based relevance;

acquiring user data concerning a user visiting the discussion forum, the user data including a set of viewed topics, a set of viewed messages, and a set of queries provided by the user;

determining a context in which the user is operating, the context being associated with a task the user is performing, the context being one of, following a topic, participating in a topic, referencing an element in a topic, and performing a combination of following a topic, participating in a topic, and referencing an element in a topic;

providing a recommendation to the user concerning a set of topics, the recommendation being based, at least in part, on the context in which the user is operating and effort based relevance for members of the set of topics; and automatically generating a set of frequently asked questions based, at least in part, on effort based relevance for members of the set of topics;

where computing effort based relevance includes:

computing an X axis component of an effort based relevance measurement based on Vw and Rp;

computing a Y axis component of the effort based relevance measurement based on Vw, Bf, and Rf;

computing an X axis partitioning measure ($\alpha$) based on the average of (Rp/Vw) for the set of topics;

computing a Y axis partitioning measure ($\beta$) based on the average of ((Rf+Bf)/Vw) for set of topics; and computing the effort based relevance based on one or more of, a Euclidean distance from a first point described by the intersection of an X axis and a Y axis, and a Euclidean distance from a second point described by the intersection of $\alpha$ and $\beta$.

2. A computer-implemented method, comprising:

receiving activity data concerning items in a set of topics being acted upon in an electronic discussion forum, the activity data comprising a view count (Vw), a book mark count (Bf), a reference count (Rf), and a reply count (Rp), where a reply count corresponds to a number of replies for an item in the electronic discussion forum;

combining the activity data to determine effort based relevance coordinates for each item, the effort based relevance coordinates defining a position of the item in a two-dimensional representation of relevance comprising a two dimensional X-Y graph, where the effort based relevance coordinates are determined by:

computing an X axis component of the effort based relevance coordinates based, at least in part, on Vw and Rp; and computing a Y axis component of the effort based relevance coordinates based, at least in part, on Vw, Bf, and Rf;

assigning a first effort based relevance to each item based, at least in part on, a distance between the effort based relevance coordinates for the item and an origin of the X-Y graph;

ranking the items according to the first effort based relevance; and providing the items to a user of the electronic discussion forum in order of ranking.

3. The computer-implemented method of claim 2 comprising:
- assigning an item relevance characteristic to each item based, at least in part on, a region of dimensional representation of relevance in which the effort based relevance coordinates for each item are positioned;
- determining a user relevance type for a user participating in the electronic discussion forum;
- selecting items having an item relevance characteristic that matches the user relevance type; and
- providing the selected items to the user in order of ranking.

4. The computer-implemented method of claim 3 where the two-dimensional representation of relevance comprises a two dimensional X-Y graph and further where the item relevance characteristic is assigned based, at least in part, on a quadrant of the X-Y graph in which the item is positioned.

5. The computer-implemented method of claim 2, the activity data including rating data (Rd) and where the method includes weighting the first effort based relevance measurement using Rd.

6. The computer-implemented method of claim 2 further comprising providing a two-dimensional plot of the relative position of the effort based relevance coordinates for the items.

7. A computer-implemented method, comprising:
- receiving activity data concerning items in a set of topics being acted upon in an electronic discussion forum, the activity data comprising a view count (Vw), a book mark count (Bf), a reference count (Rf), and a reply count (Rp), where a reply count corresponds to a number of replies for an item in the electronic discussion forum;
- combining the activity data to determine effort based relevance coordinates for each item, the effort based relevance coordinates defining a position of the item in a two-dimensional X-Y graph of relevance, where the X-Y graph is divided into quadrants by:
  - computing an X axis partitioning measure ($\alpha$) based, at least in part, on one or more of an average or median of (Rp/Vw) for the set of topics; and
  - computing a Y axis partitioning measure ($\beta$) based, at least in part, on one or more of an average or median of ((Rf+Bf)/Vw) for the set of topics;
- assigning a first effort based relevance to each item based, at least in part on, the position of the item's effort based relevance coordinates in the two-dimensional representation of relevance;
- assigning an item relevance characteristic to each item based, at least in part on, a quadrant of the X-Y graph in which the effort based relevance coordinates for each item are positioned;
- determining a user relevance type for a user participating in the electronic discussion forum;
- selecting items having an item relevance characteristic that matches the user relevance type; and
- providing the selected items to the user in order of ranking.

8. The computer-implemented method of claim 7 comprising assigning a second effort based relevance to an item based, at least in part, on a distance between the item's effort based relevance coordinates and a second point described by the intersection of $\alpha$ and $\beta$.

9. The computer-implemented method of claim 8, including computing a combined topic relevancy based, at least in part, on the first and second effort based relevance and a keyword based relevance measurement.

10. The computer-implemented method of claim 8 where the user relevance type is determined by acquiring user data concerning a user visiting the discussion forum, the user data including information concerning one or more of, a set of viewed topics, a set of viewed items, and a set of queries provided by the user; the method further comprising providing a recommendation to the user concerning one or more items, the recommendation being based, at least in part, on the context in which the user is operating and the second effort based relevance for the one or more items.

11. The computer-implemented method of claim 8, including automatically generating a set of frequently asked questions based, at least in part, on the second effort based relevance for items in the set of topics.

12. A computer-readable medium storing processor executable instructions that when executed by a computer cause the computer to perform a method, the method comprising:
- receiving activity data concerning items in a set of topics where the activity data comprises a view count (Vw), a book mark count (Bf), a reference count (Rf), and a reply count (Rp), where a reply count corresponds to a number of replies for an item in the electronic discussion forum;
- combining the activity data to determine effort based relevance coordinates for each item, the effort based relevance coordinates defining a position of the item in a two-dimensional representation of relevance comprising a two dimensional X-Y graph, where the effort based relevance coordinates are determined by:
  - computing an X axis component of the effort based relevance coordinates based, at least in part, on Vw and Rp;
  - computing a Y axis component of the effort based relevance coordinates based, at least in part, on Vw, Bf, and Rf;
- assigning a first effort based relevance to each item based, at least in part on, a distance between the effort based relevance coordinates for the item and an origin of the X-Y graph;
- ranking the items according to the first effort based relevance;
- providing the selected items to the user of the electronic discussion forum in order of ranking.

13. The computer-readable medium of claim 12 where the instructions include:
- computing an X axis partitioning measure ($\alpha$) based, at least in part, on one or more of an average or median of (Rp/Vw) for the set of topics;
- computing a Y axis partitioning measure ($\beta$) based, at least in part, on one or more of an average or median of ((Rf+Bf)/Vw) for the set of topics;
- assigning a second effort based relevance to each item based, at least in part, on a distance to a second point described by the intersection of $\alpha$ and $\beta$; and
- computing a combined topic relevancy based, at least in part, on the first and second effort based relevance and a keyword based relevance measurement.

14. The computer-readable medium of claim 12 where the instructions include:
- assigning an item relevance characteristic to each item based, at least in part on, a region of dimensional representation of relevance in which the effort based relevance coordinates for each item are positioned;
- determining a user relevance type for a user participating in the electronic discussion forum;
- selecting items having an item relevance characteristic that matches the user relevance type; and
- returning the selected items to the user.

15. A system, comprising:
- a means for tracking user actions taken on items in an electronic discussion forum, the actions including a view count (Vw), a book mark count (Bf), a reference count (Rf), and a reply count (Rp), where a reply count corresponds to a number of replies for an item in the electronic discussion forum;
- a means for combining (Vw), (Bf), (Rf), and (Rp) to determine effort based relevance coordinates for each item, the effort based relevance coordinates defining a position of the item in a two-dimensional representation of relevance assigning an item relevance to each item based, at least in part on, the position of the item in the two-dimensional representation of relevance comprising a two dimensional X-Y graph, where the effort based relevance coordinates are determined by:
  - computing an X axis component of the effort based relevance coordinates based, at least in part, on Vw and Rp; and
  - computing a Y axis component of the effort based relevance coordinates based, at least in part, on Vw, Bf, and Rf;
- a means for ranking the items according to the item relevance; and
- a means for recommending selected items to a user of the electronic discussion forum in ranking order.

16. A computer-readable medium storing processor executable instructions that when executed by a computer cause the computer to perform a method, the method comprising:
- receiving activity data concerning items in a set of topics being acted upon in an electronic discussion forum, the activity data comprising a view count (Vw), a book mark count (Bf), a reference count (Rf), or a reply count (Rp), where a reply count corresponds to a number of replies for an item in the electronic discussion forum;
- combining the activity data to determine effort based relevance coordinates for each item, the effort based relevance coordinates defining a position of the item in a two-dimensional X-Y graph of relevance, where the X-Y graph is divided into quadrants by:
  - computing an X axis partitioning measure ($\alpha$) based, at least in part, on one or more of an average or median of (Rp/Vw) for the set of topics; and
  - computing a Y axis partitioning measure ($\beta$) based, at least in part, on one or more of an average or median of ((Rf+Bf)/Vw) for the set of topics;
- assigning a first effort based relevance to each item based, at least in part on, the position of the item's effort based relevance coordinates in the two-dimensional representation of relevance;
- assigning an item relevance characteristic to each item based, at least in part on, a quadrant of the X-Y graph in which the effort based relevance coordinates for each item are positioned;
- ranking the items according to the first effort based relevance;
- determining a user relevance type for a user participating in the electronic discussion forum;
- selecting items having an item relevance characteristic that matches the user relevance type; and
- providing the selected items to the user in order of ranking.

17. The computer-readable medium of claim 16 where the instructions include assigning a second effort based relevance to an item based, at least in part, on a distance between the item's effort based relevance coordinates and a second point described by the intersection of $\alpha$ and $\beta$ and computing a combined topic relevancy based, at least in part, on the first and second effort based relevance and a keyword based relevance measurement.

18. The computer-readable medium of claim 16 where the user relevance type is determined by acquiring user data concerning a user visiting the discussion forum, the user data including information concerning one or more of, a set of viewed topics, a set of viewed items, and a set of queries provided by the user; the instructions further comprising providing a recommendation to the user concerning one or more items, the recommendation being based, at least in part, on the context in which the user is operating and the second effort based relevance for the one or more items.

19. The computer-readable medium of claim 16 where the instructions include automatically generating a set of frequently asked questions based, at least in part, on the second effort based relevance for items in the set of topics.

* * * * *